United States Patent
Yaldwyn et al.

(10) Patent No.: US 8,356,295 B2
(45) Date of Patent: Jan. 15, 2013

(54) POST-SIGNING MODIFICATION OF SOFTWARE

(75) Inventors: Ben Francis Yaldwyn, Kangaroo Point (AU); Jérôme Witmann, Kangaroo Point (AU)

(73) Assignee: Symantec Corporation, Mountain View, CA (US)

( * ) Notice: Subject to any disclaimer, the term of this patent is extended or adjusted under 35 U.S.C. 154(b) by 1880 days.

(21) Appl. No.: 11/357,778

(22) Filed: Feb. 16, 2006

(65) Prior Publication Data

US 2006/0184798 A1    Aug. 17, 2006

(30) Foreign Application Priority Data

Feb. 17, 2005    (AU) .............................. 2005900743

(51) Int. Cl.
*G06F 9/445* (2006.01)
(52) U.S. Cl. ........................ 717/175; 717/174
(58) Field of Classification Search .................. 713/176, 713/180, 187, 189; 717/173, 175
See application file for complete search history.

(56) References Cited

U.S. PATENT DOCUMENTS

| | | | |
|---|---|---|---|
| 6,049,671 A * | 4/2000 | Slivka et al. .................. | 717/173 |
| 2003/0088783 A1* | 5/2003 | DiPierro ....................... | 713/189 |
| 2005/0188203 A1* | 8/2005 | Bhaskaran et al. ........... | 713/176 |
| 2005/0262502 A1* | 11/2005 | Lari et al. ..................... | 717/175 |

OTHER PUBLICATIONS

Ash, M. et al., "Security Feature s in Windows CE," WindowsForDevices.com, Microsoft Corporation, Feb. 26, 2004, [online] [Retrieved on Feb. 9, 2006] Retrieved from the Internet<URL:http://www.windowsfordevices.com/articles/AT6765599475.html>.
Kirtland, M., "Safe Web Surfing with the Internet Component Download Service," Microsoft Systems Journal, Jul. 1996, [online] [Retrieved on Feb. 9, 2006] Retrieved from the Internet<URL:http://www.microsoft.com/msj/archive/s326.aspx>.
Examiner's First Report, Australian Patent Application No. 2006200628, Jul. 30, 2010, 1 page.

* cited by examiner

*Primary Examiner* — Jeffrey Pwu
*Assistant Examiner* — Nega Woldemariam
(74) *Attorney, Agent, or Firm* — Fenwick & West LLP

(57) ABSTRACT

A technique for making post-signing modifications to a digitally-signed software application without invalidating the signature can be used to enhance a user experience when downloading the software application. An extension module extends the length of a signature section at the end of an executable file for the digitally-signed software application to form a storage section. A header adjustment module adjusts the header to indicate size of the storage section appended at the end of the executable file. A data insertion module inserts post-signing data into the storage section, and the validity of the digital signature is maintained without requiring the file to be re-signed after insertion of the post-signing data. Thus, a software vendor can add into the software user-specific data after the file has been signed, while still maintaining the signature's validity, so the software can be downloaded with minimal interruption to the user.

20 Claims, 7 Drawing Sheets

POST-SIGNING MODIFICATION OF SOFTWARE

RELATED APPLICATIONS

This application claims the benefit of Australian Provisional Application No. 2005900743, filed on Feb. 17, 2005, entitled "Method for Post-Signing Modifications of Software," filed under the authority of IP Australia, a federal government agency within the Australian Government, located in Australia at Discovery House, 47 Bowes Street, Phillip ACT, 2606 (P.O. box 200, Woden ACT 2606), the entire disclosure of which is hereby incorporated by reference herein in its entirety for all purposes. The basis for priority is Australia's participation and membership under the following: The Paris Convention for the Protection of Industrial Property and the World Trade Organization.

BACKGROUND OF THE INVENTION

1. Field of the Invention

This invention pertains in general to computer security, and more specifically to distribution of a software application to a user where the software is modified after being digitally signed.

2. Description of the Related Art

Software applications are commonly received by users electronically. For example, a user might download the software application from a software vendor's website. To ensure that the user receives an authentic copy of the software application, copies of the software are typically digitally signed prior to transmission of the application to the user so the authenticity of the software can be verified upon receipt.

A digital signature can be used for a number of purposes. For example, a digital signature can be associated with an application to protect the integrity of the application, to protect access to the application, or to protect any confidential information the application contains. A digital signature can also be used to authenticate the identity of the entity providing the software application to the user, and to verify that the software application is being provided by the expected entity or to verify that the software has not been tampered with in transit. Thus, for a user who has purchased a software application from a website, the digital signature associated with the purchased software provides the user with some confidence that the application has not been supplied by a malicious entity that intends to cause damage or otherwise invade a user's computer (e.g., by installing a virus or other type of malicious code on the user's computer).

In order to facilitate installation, activation, registration, and use of electronically-provided software, it is desirable to incorporate user-specific data into the software application along with the digital signature. For example, the vendor may wish to incorporate specific information about the user's computer into the application. The user-specific data might also include activation information, language specification, and so forth, which allows installation of the software application onto the user's computer with minimal or no user intervention.

With the increase in security for operating systems, operating systems now commonly require digital signature of downloadable executables. However, this signature process is designed for the signing of fixed, non-changing executables and other content. It is typically not possible to dynamically add information, such as the user-specific data described above, to the application after signing without invalidating the signature. If a downloaded application has an invalid signature or is not correctly digitally signed, the operating system may prompt the user with a warning that the application is potentially dangerous. When the operating system provides a warning, the user must respond to each prompt, and thus the installation, activation, and registration processes for the software become processor intensive and time-consuming. Furthermore, re-signing each application after addition of user data is not a reasonable solution, since digitally signing a file can be a slow process, which would again delay the user's ability to download the software.

Therefore, there is a need in the art for a solution that allows for modification of software after it has been digitally-signed to incorporate post-signing data into the application.

DISCLOSURE OF INVENTION

The above need is met by a modification control module that makes post-signing modifications to a digitally-signed software application being downloaded by a user onto a computer. In some embodiments, a file creation module creates an executable file that can be digitally signed to form a signature section at the end of the file. The executable file also includes a header describing sections of the executable file. An extension module extends the length of a signature section at the end of an executable file for the digitally-signed software application to form a storage section. A header adjustment module adjusts the header to indicate size of the storage section appended at the end of the executable file. A data insertion module inserts post-signing data into the storage section. Validity of the digital signature is maintained without requiring the file to be re-signed after insertion of the post-signing data.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The modification control module can create an executable file for a software application to be downloaded by a user. The executable file is digitally signed to form a signature section of the file. During the signature process, a header of the executable file that describes the contents of the file and how they are arranged is adjusted to indicate the position of the signature section at the end of the file. The modification control module then extends the length of the signature section at the end of the file to form a storage section. The header for the file is adjusted to accommodate the extra storage, for example by adjusting the size of a security directory entry within the header. Data is added to this storage section without interfering with the validity of the signature.

This post-signing modification or addition of data to the file does not invalidate the digital signature because the data is specifically written into the signature section of the file where the signature is located. When a file is authenticated, the signature algorithm involved in the authentication ignores the signed section of the file where the signature itself is inserted, so modifications made to this portion of the file after signing do not affect the validity of the signature. Thus, the modification control module can add post-signing data (e.g., user-specific or unique data, an activation key, language text strings, etc.) to this signed section of the file when the software application is being downloaded by a user without having to re-sign the file at the time of download. This post-signing data can allow the user to easily install the application onto the computer without user intervention.

As used herein, the term "user" is not limited to human users, but can also include other non-human entities, such as software agents, etc. The term "vendor" includes any provider of software, whether purchased for money or free software. The term "purchase" can include any type of purchase or obtaining of a software application from a vendor, where the user may pay a certain amount of money for the software application or where the user may obtain the software application without paying any money (e.g., a non-purchased application, such as "trialware," where a user downloads a trial version of a software application).

Figure 1:
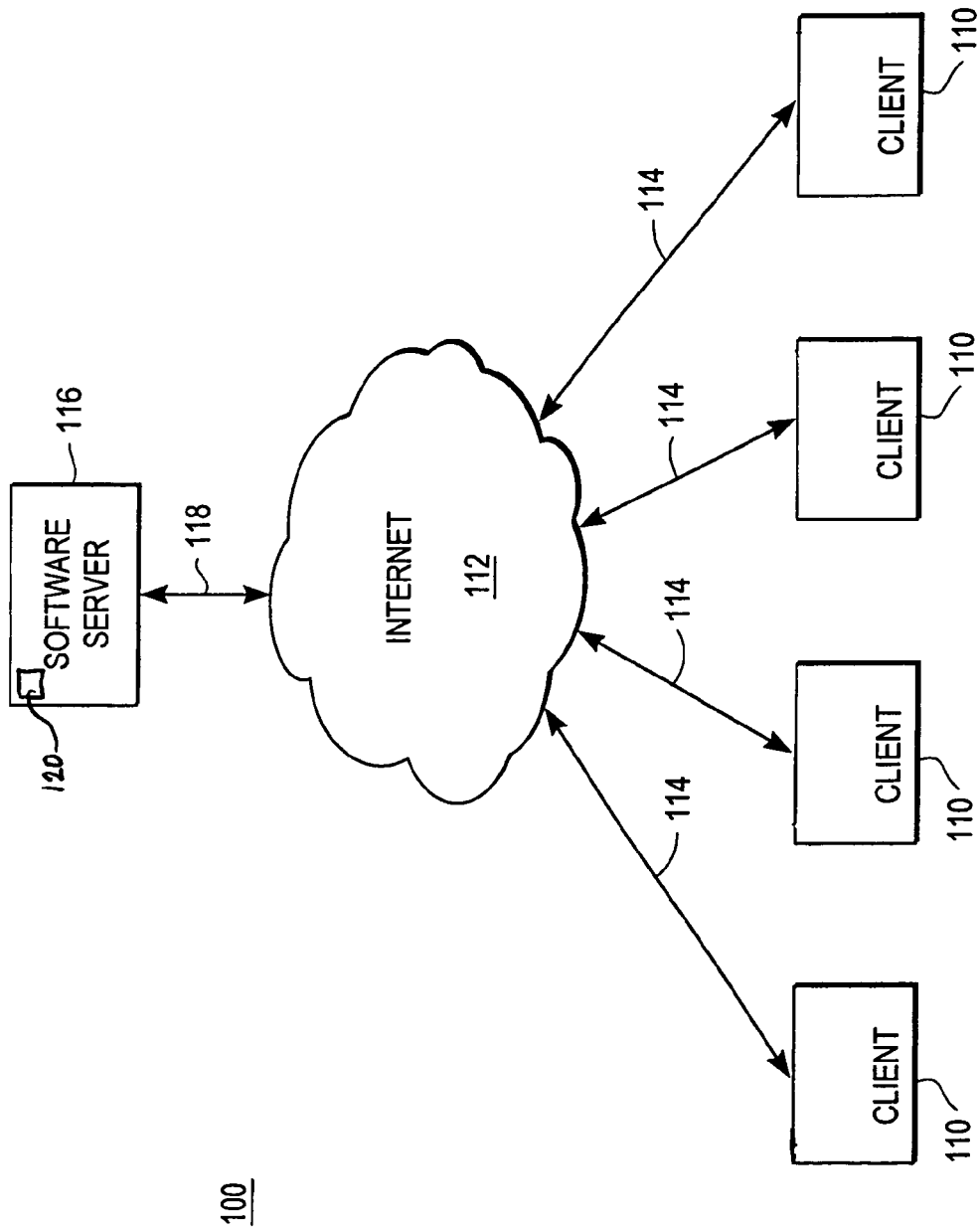
FIG. 1 is a high-level block diagram illustrating an example of a standard computing environment 100, according to one embodiment of the present invention.

FIG. 1 is a high-level block diagram illustrating a computing environment 100 according to an embodiment of the present invention. Multiple client computers 110 are in communication with the Internet 112 or other network, such as a local area network, wide area network, etc. via communications links 114. Although only four client computers 110 are shown in FIG. 1, there can be thousands or even millions of computer systems coupled to the Internet 112, according to embodiments of the present invention. The client computers 110 can be conventional computer systems or different electronic devices having connectivity to remote update sources, such as cellular telephones, personal digital assistants (PDAs), etc. A server 116 is also connected to the Internet 112 via a communications link 118.

As is known in the art, the client computers 110 preferably execute an operating system and one or more application programs. The operating system controls the operation of the computer system, and some examples of such an operating system include LINUX®, one of the versions of MICROSOFT WINDOWS®, and PALM OS®.

In FIG. 1, each client computer 110 is connected to the Internet 112 via a communications link 114. Preferably, the communications link 114 utilizes conventional networking technology, including using a modem to connect over standard telephone lines with an Internet Service Provider (ISP) having a high-speed connection to the Internet 112, a digital subscriber line (DSL) or cable modem to access the ISP via a telephone line or cable television line, a network card and Ethernet connection to directly connect to the Internet 112, a wireless 802.11, Bluetooth, or mobile phone (e.g., CDMA or GSM) network, satellite downlink, uplink, or bi-directional link, etc.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. In some embodiments, the server 116 is controlled by a software vendor from whom a software application can be downloaded and sent across the Internet 112 to the client computers 110. Additionally, the client computers 110 can send out information or make requests (e.g. user-specific information, requests to purchase software, etc.) across the Internet 112 to the server 116 or to other computers 110. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, the server 116 executes a modification control module 120 for making a post-signing modification to a digitally-signed software application being provided to a user. The modification control module 120 can be a discrete application program, or the module 120 can be integrated into another application program or an operating system. In some embodiments, a portion of the modification control module 120 is executed on the client computers 110.

Figure 2:
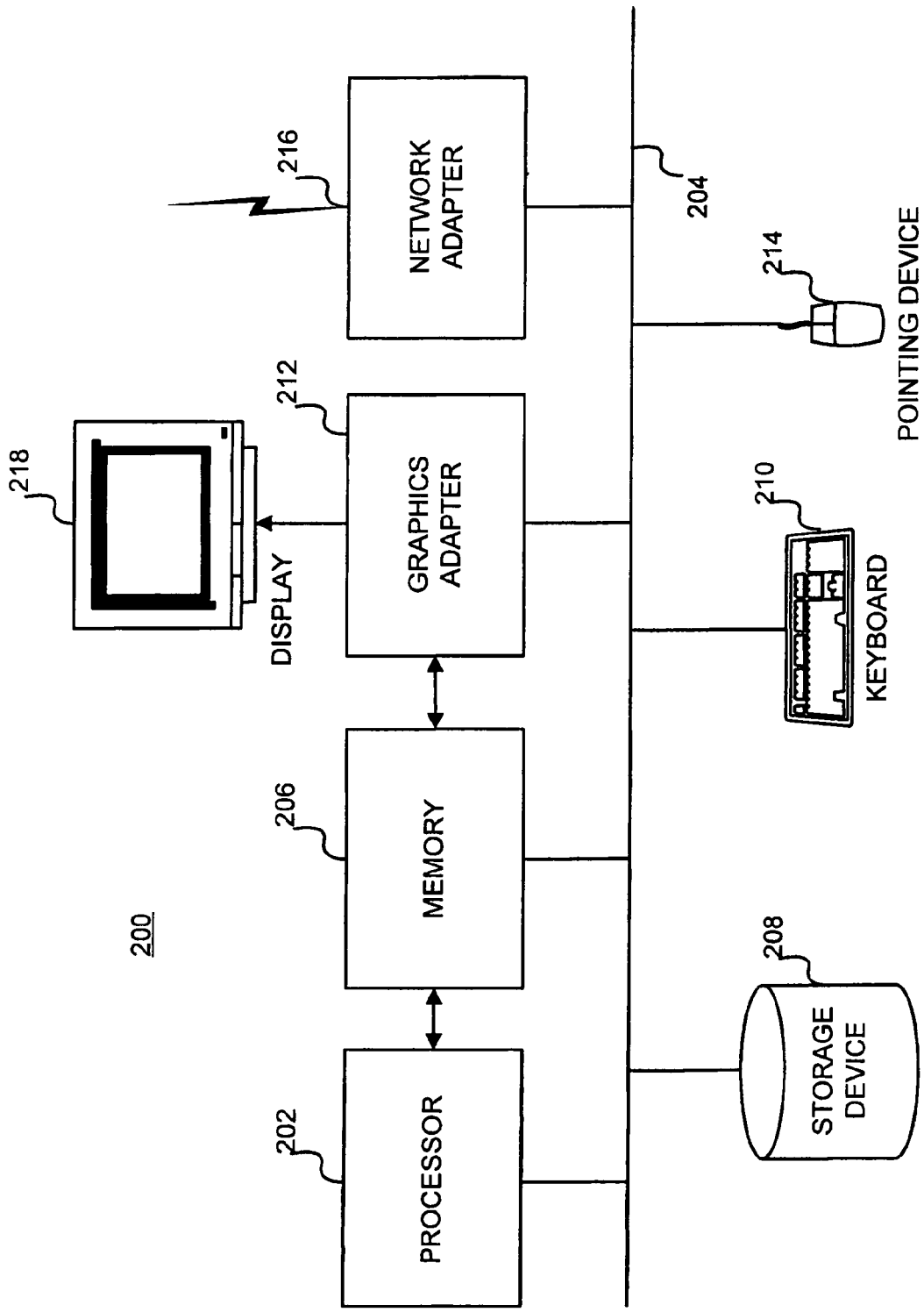
FIG. 2 is a high-level block diagram illustrating a standard computer system 200 for use with the present invention.

FIG. 2 is a high-level block diagram illustrating a functional view of a typical computer system 200 for storing and executing the modification control module 120, according to one embodiment of the present invention. This computer system 200 can act as a server 116, as shown in FIG. 1. However, one or more of the components of the computer system 200 may be missing or modified in the server 116. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the server 116 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium, having computer program instructions recorded thereon, such as the storage device 208, loaded into the memory 206, and executed by the processor 202. Alternatively, hardware or software modules may be stored elsewhere within the computer system 200.

Figure 3A:
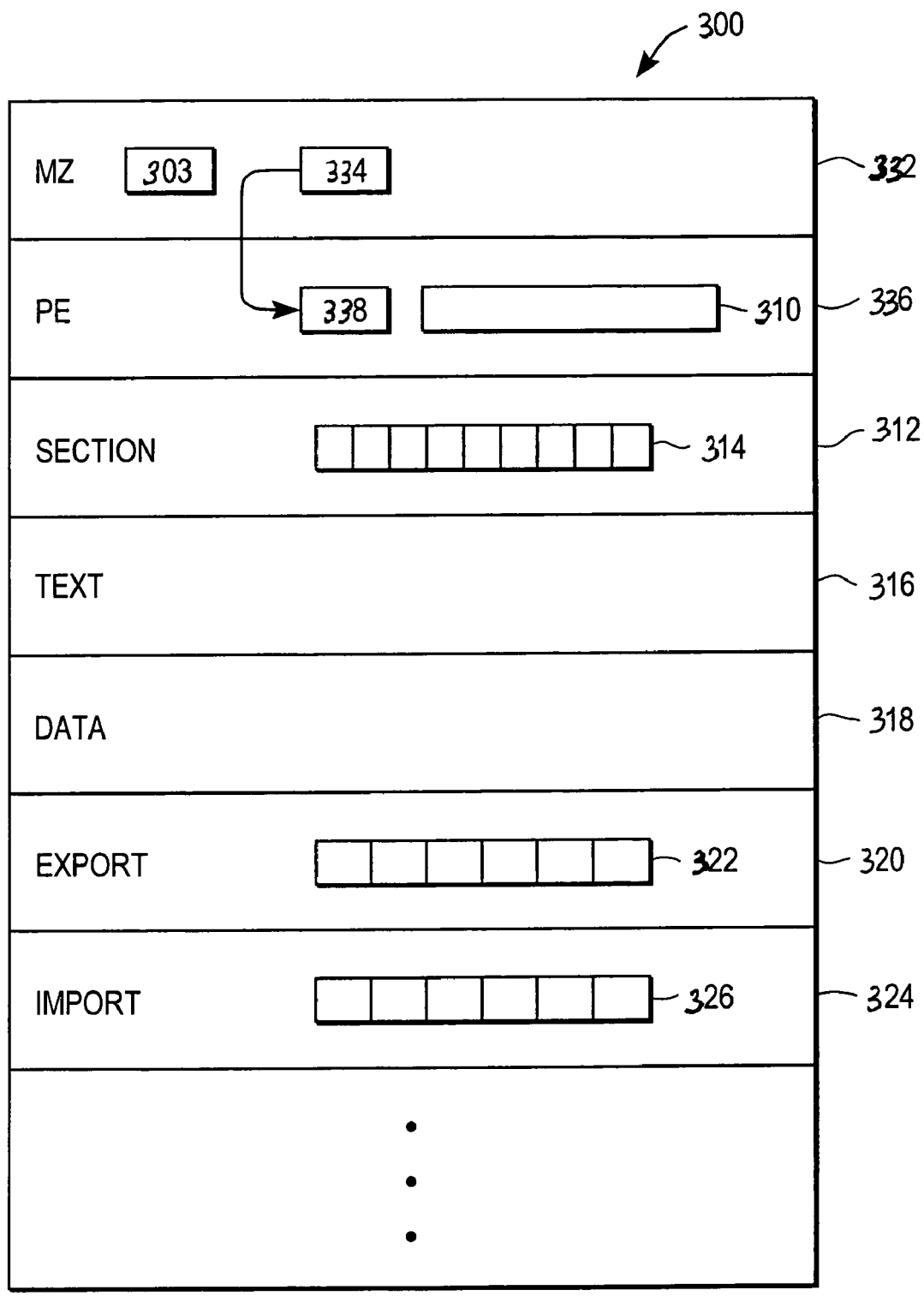
FIG. 3a is a high-level block diagram illustrating a portable executable file 300, according to one embodiment of the present invention.

FIG. 3a is a high-level block diagram of a portable executable file 300 according to some embodiments of the invention. In the example illustrated by FIG. 3a, the executable file is a Win32 portable executable (PE) file intended for use with a MICROSOFT WINDOWS-based operating system (OS), such as WINDOWS ME, WINDOWS NT, WINDOWS 2000, or WINDOWS XP. Typically, the illustrated file 300 is of the type .EXE, indicating that the file is an executable file, or .DLL, indicating that the file is a dynamic link library (DLL). However, the present invention can be used with any file, and is not limited to only the type of file illustrated in FIG. 3a. APPLE MACINTOSH files, for example, share many similarities with Win32 files, and the present invention is equally applicable to such files.

The file 300 is divided into sections containing either code or data and aligned along four kilobyte (KB) boundaries. The MS-DOS section 332 contains the MS-DOS header 332 and is marked by the characters "MZ." This section 332 contains a small executable program 303 designed to display an error message if the executable file is run in an unsupported OS (e.g., MS-DOS). The MS-DOS section 332 also contains a field 334 holding the relative offset to the start 338 of the PE section 336.

The PE section 336 is marked by the characters "PE" and holds a data structure 310 containing basic information about the file 300. The data structure 310 holds many data fields describing various aspects of the file 300.

The next section 312 holds the section table 314. The section table 314 contains information about each section in the file 300, including the section's type, size, and location in the file 300. For example, entries in the section table 314 indicate whether a section holds code or data, and whether the section is readable, writeable, and/or executable. Each entry in the section table 314 describes a section that may have multiple, one, or no entry points.

The text section 316 holds general-purpose code produced by the compiler or assembler. The data section 318 holds global and static variables that are initialized at compile time.

The export section 320 contains an export table 322 that identifies functions exported by the file 300 for use by other programs. An EXE file might not export any functions but DLL files typically export some functions. The export table 322 holds the function names, entry point addresses, and export ordinal values for the exported functions. The entry point addresses typically point to other sections in the file 300.

The import section 324 has an import table 326 that identifies functions that are imported by the file 300. Each entry in the import table 326 identifies the external DLL and the imported function by name. When code in the text section 316 calls a function in another module, such as an external DLL file, the call instruction transfers control to a JMP instruction also in the text section 316. The JMP instruction, in turn, directs the call to a location within the import table 326.

Figure 3B:
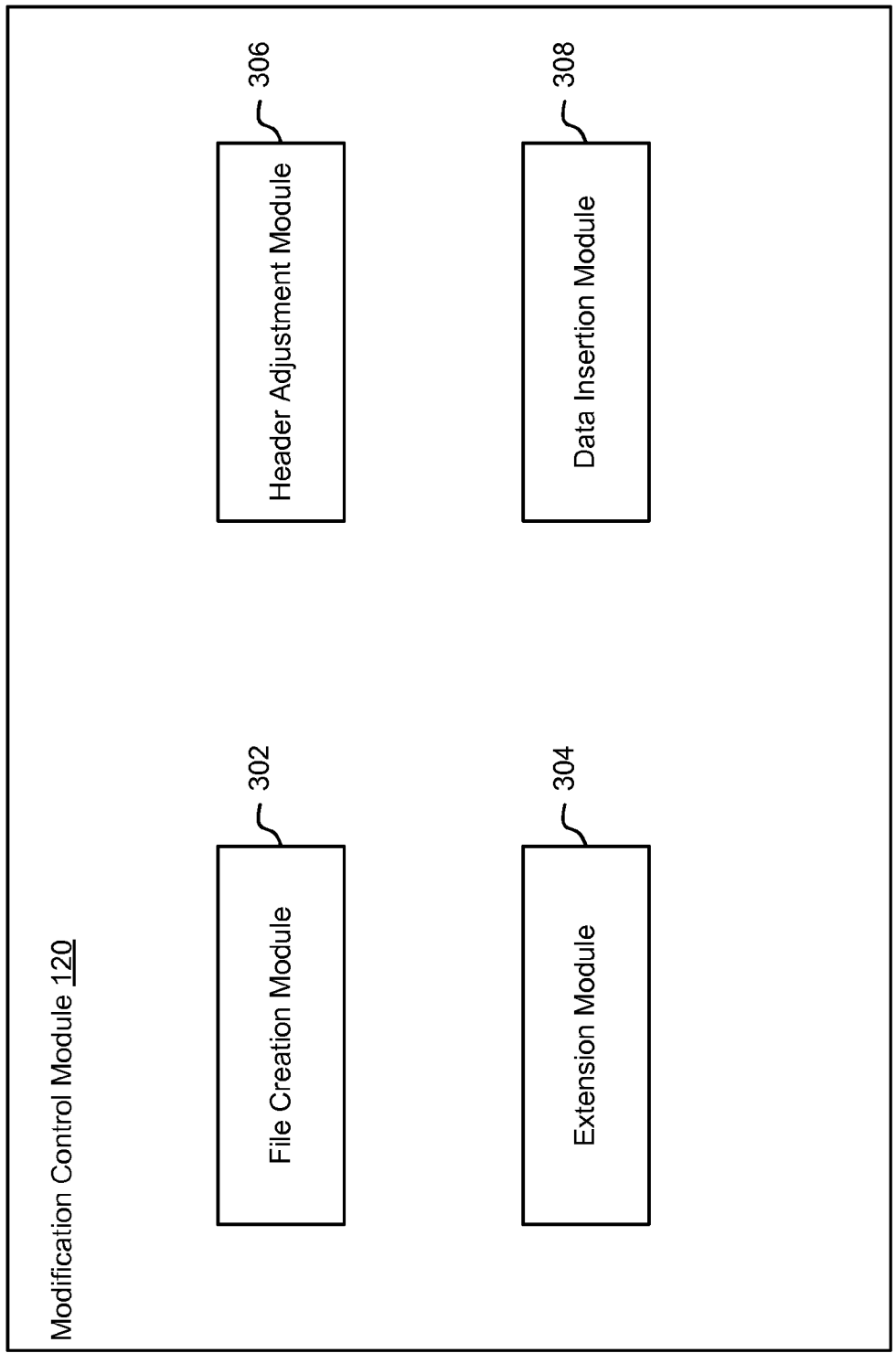
FIG. 3b is a high-level block diagram illustrating the functional modules within the modification control module 120, according to one embodiment of the present invention.

FIG. 3b is a high-level block diagram illustrating the functional modules within the modification control module 120, according to one embodiment of the present invention. The modification control module 120, in the embodiment illustrated in FIG. 3b, includes a file creation module 302, a extension module 304, a header adjustment module 306, and a data insertion module 308. Those of skill in the art will recognize that other embodiments can have different and/or additional modules than those shown in FIG. 3b and the other figures. Likewise, the functionalities can be distributed among the modules in a manner different than described herein.

Figure 4A:
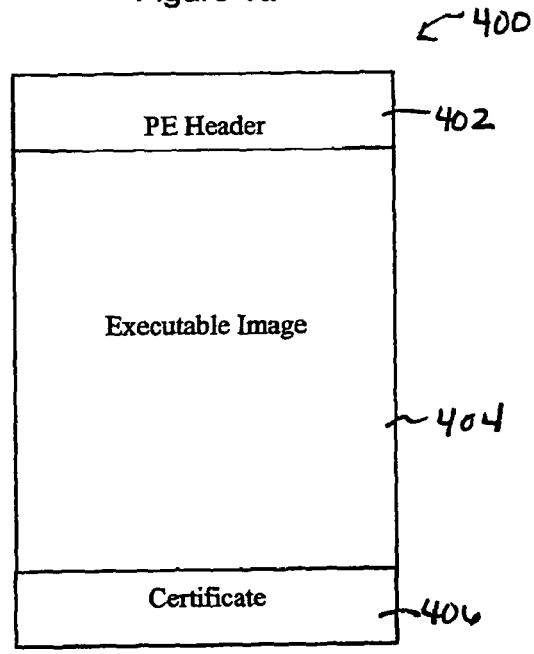
FIG. 4a is a high-level block diagram illustrating the sections of an executable file 400, according to one embodiment of the present invention.

The optional file creation module 302 creates the executable file. The executable file created can be a PE file 300 as described above or some other type of executable file. The executable file is digitally signed (e.g., using standard tools for creating a digital signature, such as MICROSOFT AUTHENTICODE™) to form a signature section at the end of the file (as indicated by the header for the file). FIG. 4a illustrates a simplified high-level block diagram of an executable file 400, according to some embodiments of the present invention. Where the executable file 400 is a PE file 300, as described in FIG. 3a, the file 400 can include any or all of the sections of the PE file 300 shown in FIG. 3a. In addition, the PE file 300 can be digitally signed, and so can include a digital certificate 406, as shown in FIG. 4a.

In the example shown in FIG. 4a, the executable file includes a header 402, an executable image 404 (e.g., the location where the executable code is stored), and a signature section including the certificate 406 for a digital signature of the file. The header 402 describes the sections of the file, lengths of the sections, and how these sections are associated. The signature section is where the certificate 406 of the digital signature is located and where the file 400 is signed. When the file 400 is digitally signed, the certification data is appended to the end of the file 400. In the present invention, the executable file 400 is included with the software application being downloaded by the user, and the digital signature of the file 400 can be used for authentication of the software application.

Digital signatures typically contain information about a vendor who created the file and is providing the software application for download. The digital signature of a file also allows a user to verify that the file has not been tampered with since the signature was attached, because the digital signature would be invalidated if the file were modified after signing. As an example, MICROSOFT has a WINDOWS TRUST VERIFICATION SERVICE for validating signatures. When a user downloads a file, this SERVICE searches the file for a digital signature that contains information about the file author, a public key, and an encrypted digest of the files contents. Where a signature is present, the SERVICE validates the certificate provided by the vendor. A certificate is a digitally signed statement including data about a vendor providing the application and that vendor's public key. If there is any problem with the certificate, the user is notified that the file could be dangerous and the user can decide whether or not to install the file. If the certificate is valid, the SERVICE can conduct some further decryption steps to fully authenticate the application before it is installed on the computer 110.

As described above, a digital signature can be added to a PE file 300 (e.g., MICROSOFT has tools that allow a vendor to generate certificates and signatures, and to embed these in a PE file 300). To create a digital signature from a file 300, the file 300 is generally run through a hash function and the resulting hash is signed with a private key. The signature can be embedded in a PE file 300, the certificate appended to the end of the file 300, and the PE header updated accordingly (e.g., SIGNFILE.EXE included in MICROSOFT PLATFORM BUILDER performs these functions). The hash formula used to generate the signature can also be used for verification. The signature calculated from the hash during verification can be compared to the signature in the file 300 to authenticate that signature.

More information about digital signatures can be found at: Mary Kirtland, *Safe Web Surfing with the Internet Component Download Service*, Microsoft Systems Journal, July 1996, and Marcus Ash and Mukkul Dasgupta, *Security Features in Windows CE*, Microsoft Corporation, January 2003, the entire disclosures of which are hereby incorporated by reference herein in their entirety for all purposes.

Figure 4B:
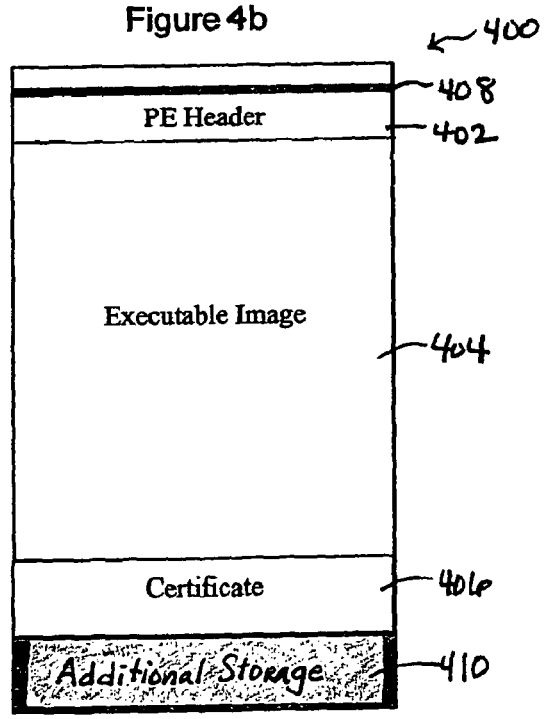
FIG. 4b is a high-level block diagram illustrating the sections of a digitally-signed executable file 400, according to one embodiment of the present invention.

The extension module 304 extends the length of the signature section (containing the digital signature) at the end of the executable file 400 for the digitally-signed software application to form a storage section 410 at an end of the signature section. Thus, the module 304 extends the size stored inside the signature package itself (e.g., modifies the size of the digital certificate), since the signature must reflect the correct size. In some embodiments, the additional storage can be added to the binary by extending the length of the signature section in the header directory for the digital certificate (e.g., the header for the digital certificate contains the size of the digital certificate). Thus, the header directory of the signature section header reflects a larger signature section, allowing for extra storage in the signature section into which data can be inserted. FIG. 4b illustrates a high-level block diagram of the executable file 400 with a storage section 410 appended to the end. Again, the PE file 300 of FIG. 3a can also have a certificate 406 with a storage section 410 appended at the end.

The header adjustment module 306 adjusts the header 402 for the executable file to indicate the size the storage section 410 appended at the end of the executable file 400. In some embodiments, the header references other sections of the file using an offset and a length. The offset describes the distance from the beginning of the file to the start of a section of the file (e.g., the signature section). The length describes the size of the section in the same terms. In some embodiments, when the module 306 extends the length of the certificate storage, it increases the size field for that section (e.g., the signature section) of the header. Since the signature section is typically placed at the end of the file when the file is signed, there is no need to update the offsets of any sections following the signature section to account for the change in size.

In some embodiments, when adjusting the header, the module 306 more specifically adjusts the size of a security directory entry (e.g., the specific portion or entry of a directory in the header 402 that describes where the signature is located) within the header to accommodate the additional storage area. The module 306 extends the size of the security directory in the header so the operating system will be aware of the correct size of the digital certificate 406. FIG. 4b illustrates this adjustment to the header 402 as adjusted section 408. This section 408 of the header 402 is adjusted to reflect the increased size as a result of the addition of the storage section 410 at the end of the signature section.

The data insertion module 308 inserts post-signing data into the storage section 410 without invalidating the digital signature of the digitally-signed software application. In some embodiments, the post-signing data allows the user to execute the digitally-signed software application on the computer 110. The post-signing data can include various types of data. For example, the post-signing data can be user-specific data, such as data regarding a user's computer 110 (e.g., the computer type, processor, operating system, etc.) or regarding the user himself (e.g., name, purchase information, etc.), an activation key for activating the software application once installed on the user's computer 110, language text strings, user-defined information (e.g., user preferences for the application), and the like. The post-signing data can be a unique fingerprint or identifier for the user's computer 110. In some embodiments, the vendor from whose website the user is downloading the software application can select certain post-signing information to be included in the storage section, such as a unique identifier for the user's computer 110 to ensure that the software application can only be executed on that particular computer 110. The vendor can collect information from the user's computer 110 at the time of downloading. In some embodiments, the post-signing data allows the user to easily install and execute the software application without user intervention.

Since the post-signing data is added into the storage section 410 formed within the signature section, the addition of the data does not invalidate the digital signature. As described above, the signature algorithm ignores the signature section of the file 400 when the authentication process occurs. Thus, modifications to this section, such as the adding of post-signing data, can occur without tampering with the digital signature, itself.

Figure 5:
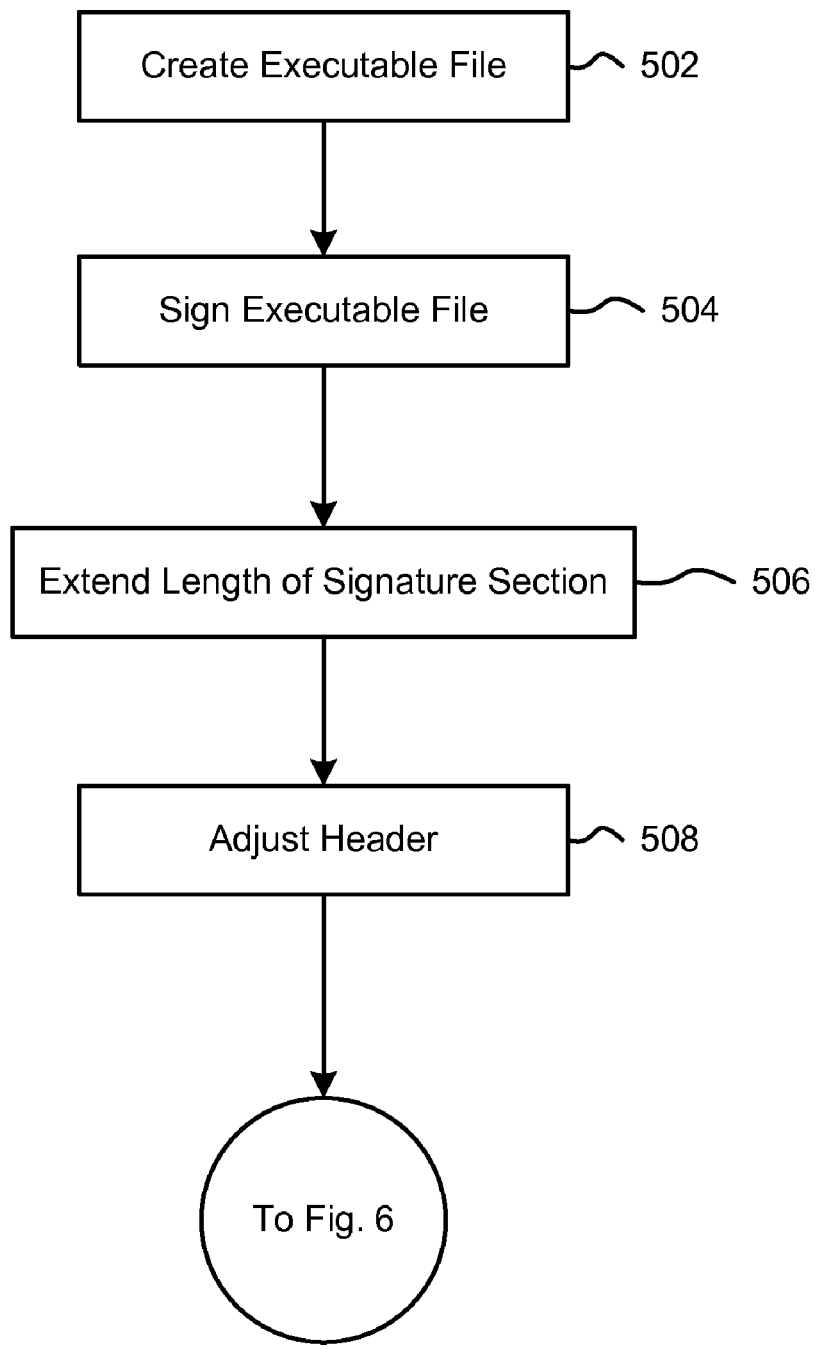
FIG. 5 is a flowchart illustrating steps performed to create and adjust the executable file, according to one embodiment of the present invention.

Referring now to FIG. 5, there is shown a flowchart illustrating the operation of the modification control module 120, according to some embodiments of the present invention. Specifically, FIG. 5 illustrates the steps of the modification control module 120 involving creation and adjustment of executable file 400. It should be understood that these steps are illustrative only. Different embodiments of the modification control module 120 may perform the illustrated steps in different orders, omit certain steps, and/or perform additional steps not shown in FIG. 5 (the same is true for FIG. 6).

As shown in FIG. 5, in some embodiments, the modification control module 120 creates 502 an executable file 400

(e.g., a PE file 300) that is then digitally signed 504 (e.g., by a program known in the art for digitally signing files, such as MICROSOFT AUTHENTICODE™). As shown in FIG. 4b, the certificate 406 is added to the end of the file 400. In some embodiments, the header 402 is adjusted through the signature process itself to indicate that this signature has been added at the end of the file 400. After signing 504 of the executable file 400, the modification control module 120 extends 506 the length of the signature section at the end of the executable file 400 for the digitally-signed software application to form a storage section 410 at the end of the signature section. As illustrated in FIG. 4b, this storage section 410 is located in the file 400 immediately after the certificate 406. To add this extra storage at the end of the file 400, the module 120 can modify the digital certificate 406 itself (e.g., by modifying a header directory for the certificate 406). The module 120 also adjusts 508 the header 502 for the executable file to indicate the size of the storage section appended at the end of the executable file, for example by adjusting the size of a security directory entry within the header 502.

Figure 6:
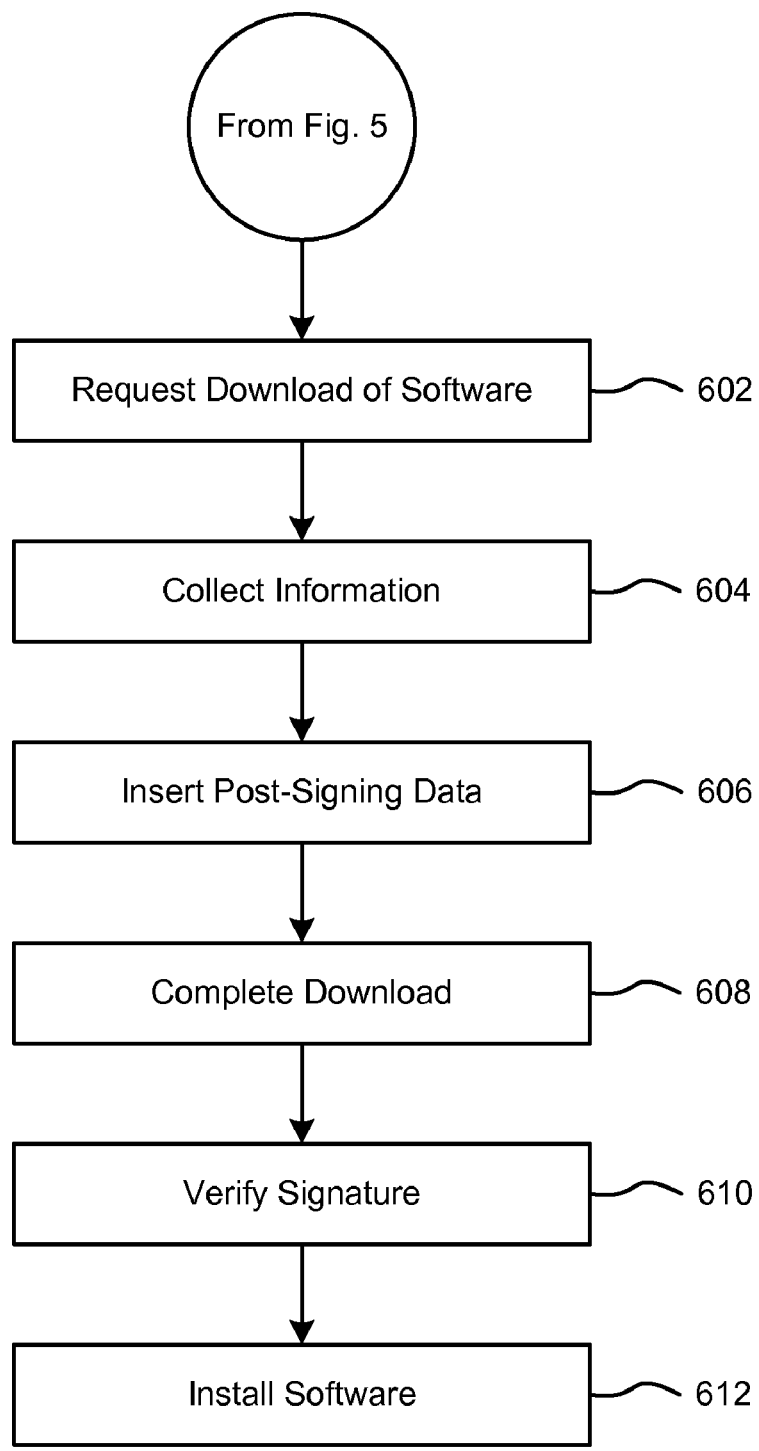
FIG. 6 is a flowchart illustrating steps performed to insert post-signing data into the file and to provide the application to the user, according to one embodiment of the present invention.

Referring now to FIG. 6, there is shown a flowchart illustrating the operation of the modification control module 120, according to some embodiments of the present invention. Specifically, FIG. 6 illustrates the steps of the modification control module 120 involving insertion of post-signing data and provision of the application to the user.

The digitally-signed file 400 including the appended storage section 410 is now ready to be provided to a user. In some embodiments, the user makes a request 602 to download the software application over the Internet 112. The user might go to a vendor's website and pay money to purchase the application or might request a free download of the software. In some embodiments, the vendor then collects 604 information from the user, such as information regarding the user's computer, processor, operating system, etc. to be added to the executable file 400 as post-signing data. In other embodiments, the vendor may have some information on hand already that the vendor wishes to add as post-signing data. The modification control module 120 then inserts 606 this post-signing data into the storage section 410 of the file 400. In some embodiments, the post-signing data allows the user to install the software application on the computer 110 with minimal user intervention. For example, the data itself may include activation information that makes it easier for the user to install the application without requiring the user to interact in the installation process. In addition, since the digital signature was not invalidated by the added data, the user does not have to intervene to make decisions regarding installation of an application with an invalid signature.

Once the post-signing data has been inserted 606 by the modification control module 120, the user can complete 608 the download of the application. The validity of the digital signature is maintained in the digitally-signed software application downloaded by the user without requiring the file to be re-signed after insertion of the post-signing data. The digital signature can be verified 610 by the user's computer 110, as described above. The user can then continue with the installation and/or execution 612 of the application.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product having a non-transitory computer-readable storage medium having computer program instructions recorded thereon for making a post-signing modification to a digitally-signed software application to be downloaded by a user onto a computer, the computer program instructions comprising instructions for:
   digitally signing an executable file having a header describing sections of the executable file and an executable section where executable code is stored, the digital signing forming a signature section with certification data appended to an end of the executable section;
   following the digital signing of the executable file, extending a length of the signature section appended to the end of the executable section of the digitally-signed software application to form a storage section after an end of the signature section;
   adjusting the header to indicate a size of the storage section appended at the end of the executable file;
   providing the digitally-signed software application with the storage section to the user requesting the software application for installation on the computer; and
   during the providing of the software application to the user, inserting post-signing data specific to the user and the computer into the storage section without invalidating the digital signature and without requiring the file to be re-signed after insertion of the post-signing data.

2. The computer program product of claim 1, wherein adjusting the header further comprises adjusting size of a security directory entry within the header to accommodate the size of the storage section.

3. The computer program product of claim 1, wherein the digital signature is used by the computer for validating authenticity of the digitally-signed software application downloaded by the user from a website and wherein the post-signing data assists the user in installing the digitally-signed software application.

4. The computer program product of claim 1, further comprising creating the executable file, wherein the executable file is digitally signed to form the signature section of the executable file.

5. The computer program product of claim 1, wherein the extending length of a signature section to form the storage section further comprises extending size of the signature section in a header directory of a signature section header to reflect the formed storage section at the end of the signature section that is located at the end of the executable file to prevent a need for an update to offsets of any other sections to account for the extended size.

6. A method of making a post-signing modification to a digitally-signed software application to be downloaded by a user onto a computer, the method comprising:
  digitally signing, by a computer system, an executable file having a header describing sections of the executable file and an executable section where executable code is stored, the digital signing forming a signature section with certification data appended to an end of the executable section;
  following the digital signing of the executable file, extending, by the computer system, a length of the signature section appended to the end of the executable section of the digitally-signed software application to form a storage section after an end of the signature section;
  adjusting, by the computer system, the header to indicate a size of the storage section appended at the end of the executable file;
  providing, by the computer system, the digitally-signed software application with the storage section to the user requesting the software application for installation on the computer; and
  during the providing of the software application to the user, inserting, by the computer system, post-signing data specific to the user and the computer into the storage section without invalidating the digital signature and without requiring the file to be re-signed after insertion of the post-signing data.

7. The method of claim 6, wherein adjusting the header further comprises adjusting, by the computer system, size of a security directory entry within the header to accommodate the size of the storage section.

8. The method of claim 6, wherein the step of inserting the post-signing data into the storage section further comprises inserting post-signing data into the storage section of the digitally-signed software application during the downloading of the digitally-signed software application by the user.

9. The method of claim 6, wherein the post-signing data specific to the particular user and the computer comprises information specified by a vendor of the software application for incorporation into the storage section at installation time, the information specified including a unique identifier for the computer that ensures that the software application can only be executed on the computer and not on other computers.

10. The method of claim 6, further comprising collecting from the computer the post-signing data to be included in the storage section during download of the software application onto the computer, the post-signing data including information that uniquely identifies the computer on which the software application will be installed and that uniquely identifies the user of the computer.

11. The method of claim 6, further comprising collecting from the user and the computer the post-signing data to be included in the storage section during download of the software application onto the computer, the post-signing data including a name of the user and purchase information for the user.

12. The method of claim 6, further comprising collecting from the user the post-signing data to be included in the storage section during download of the software application onto the computer, the post-signing data including user preferences for configuration of the application and a preferred language of the user to be used in the software application.

13. The method of claim 6, wherein extending length of a signature section to form the storage section further comprises extending, by the computer system, size of the signature section in a header directory of a signature section header.

14. The method of claim 6, wherein inserting post-signing data further comprises storing, by the computer system, a unique fingerprint for the user's computer in the storage section.

15. A computer system for making a post-signing modification to a digitally-signed software application to be downloaded by a user onto a computer, the system comprising:
  a non-transitory computer-readable storage medium storing executable software modules comprising:
    a file creation module for digitally signing an executable file having a header describing sections of the executable file and an executable section where executable code is stored, the digital signing forming a signature section with certification data appended to an end of the executable section;
    an extension module for, following the digital signing of the executable file, extending a length of the signature section appended to the end of the executable section of the digitally-signed software application to form a storage section after an end of the signature section;
    a header adjustment module for adjusting the header to indicate a size of the storage section appended at the end of the executable file;
    a data insertion module for:
      providing the digitally-signed software application with the storage section to the user requesting the software application for installation on the computer; and
      during the providing of the software application to the user, inserting post-signing data specific to the user and the computer into the storage section without invalidating the digital signature and without requiring the file to be re-signed after insertion of the post-signing data; and
  a processor configured to execute the software modules stored by the non-transitory computer-readable storage medium.

16. The system of claim 15, wherein the header adjustment module is further adapted for modifying size of a security directory entry of the header to accommodate the size of the storage section.

17. The system of claim 15, wherein the extension module is further adapted for extending size of the signature section in a header directory of a signature section header.

18. The system of claim 15, wherein the post-signing data is user-specific data collected by a software vendor that allows the user to install the digitally-signed software application on the computer.

19. The system of claim 15, wherein the post-signing data is selected from a group consisting of: activation information and language text strings.

20. A computer system for making a post-signing modification to a digitally-signed software application to be downloaded by a user onto a computer, the system comprising:
  a non-transitory computer-readable storage medium storing executable software means comprising:
    means for digitally signing an executable file having a header describing sections of the executable file and an executable section where executable code is stored, the digital signing forming a signature section with certification data appended to an end of the executable section;
    following the digital signing of the executable file, means for extending a length of the signature section appended to the end of the executable section of the digitally-signed software application to form a storage section after an end of the signature section;

means for adjusting the header to indicate a size of the storage section appended at the end of the executable file; means for providing the digitally-signed software application with the storage section to the user requesting the software application for installation on the computer;

during the providing of the software application to the user, means for inserting post-signing data specific to the user and the computer into the storage section without invalidating the digital signature and without requiring the file to be re-signed after insertion of the post-signing data; and a processor configured to execute the software means stored by the non-transitory computer-readable storage medium.

* * * * *